US010266333B1

(12) United States Patent
Nelson et al.

(10) Patent No.: US 10,266,333 B1
(45) Date of Patent: *Apr. 23, 2019

(54) TELESCOPING SPRING WITH ELECTRONIC CONTROL

(71) Applicant: Flextronics AP, LLC, Broomfield, CO (US)

(72) Inventors: Andrew Peter Nelson, Dallas, TX (US); Christopher Desha Breslin, Brownsburg, IN (US)

(73) Assignee: Flextronics AP, LLC, Broomfield, CO (US)

( * ) Notice: Subject to any disclaimer, the term of this patent is extended or adjusted under 35 U.S.C. 154(b) by 716 days.

This patent is subject to a terminal disclaimer.

(21) Appl. No.: 14/469,506

(22) Filed: Aug. 26, 2014

Related U.S. Application Data

(60) Provisional application No. 61/885,957, filed on Oct. 2, 2013, provisional application No. 61/886,031, filed on Oct. 2, 2013.

(51) Int. Cl.
*B65D 83/00* (2006.01)
*F03G 1/10* (2006.01)

(52) U.S. Cl.
CPC ............ *B65D 83/0038* (2013.01); *F03G 1/10* (2013.01)

(58) Field of Classification Search
CPC .... A61M 2207/00; A61M 2005/14252; A61M 2005/1426; A61M 2005/1581; A61M 2005/1585; A61M 2005/3104; A61M 2005/3114; A61M 2205/6063; A61M 5/5086; A61M 15/0025; A61M 15/0065; A61M 15/0073; A61M 15/08; A61M 2005/14204; A61M 2005/16863; A61M 2205/073; A61M 2205/3334; A61M 5/158; A61M 5/16831; A61M 5/1684; A61M 5/172; A61M 5/385; A61M 5/20; A61M 5/2033; A61M 5/31578; A61M 2209/045; A61M 5/14248; A61M 2005/14268; A61M 2005/31516; A61M 2005/341; A61M 2205/0266; A61M 5/1413; A61M 5/01;
(Continued)

(56) References Cited

U.S. PATENT DOCUMENTS 5,085,643 A * 2/1992 Larkin ................ A61M 5/1452
604/152
2007/0112326 A1 * 5/2007 Bosshard .............. A61M 5/145
604/500
(Continued)

OTHER PUBLICATIONS

Non-final office action, U.S. Appl. No. 14/469,518, filed Aug. 26, 2014, applicant.: Andrew Peter Nelson, dated May 3, 2017, 14 pages.

*Primary Examiner* — Brandy S Lee
(74) *Attorney, Agent, or Firm* — Haverstock & Owens LLP

(57) ABSTRACT

A delivery system having a telescoping spring is used to drive a plunger. The telescoping spring includes a nested inner spring that uses the unused volume on the inside of an outer spring. The telescoping spring has a staged release of each spring. The inner spring is connected to a non-anchored end of the outer spring, and rides within a container located within an inner dimension of the outer spring. The spring constant K of each spring can be the same or different. The delivery system can be fully mechanical or implemented as a smart delivery system under electronic control.

20 Claims, 18 Drawing Sheets

(58) Field of Classification Search
CPC ....... B65B 3/003; B65B 7/2821; B65B 15/04; B65B 3/30; B65B 57/145; B65B 7/161; B05B 11/0038; B65D 83/0038; F03G 1/10

See application file for complete search history.

(56) References Cited

U.S. PATENT DOCUMENTS

| | | | |
|---|---|---|---|
| 2008/0051714 A1* | 2/2008 | Moberg | A61M 5/1413 604/135 |
| 2009/0124979 A1* | 5/2009 | Raymond | A61M 5/14244 604/195 |
| 2013/0060196 A1 | 3/2013 | O'Connor et al. | |
| 2013/0060233 A1* | 3/2013 | O'Connor | A61M 5/158 604/506 |
| 2013/0066274 A1 | 3/2013 | O'Connor et al. | |

\* cited by examiner

Fig. 19 — Graph 5

TELESCOPING SPRING WITH ELECTRONIC CONTROL

RELATED APPLICATIONS

This Patent Application claims priority under 35 U.S.C. 119 (e) of the U.S. Provisional Application, Ser. No. 61/885,957, filed Oct. 2, 2013, and entitled "Telescoping Spring" and U.S. Provisional Application, Ser. No. 61/886,031, filed Oct. 2, 2013, and entitled "Telescoping Spring with Electronic Control". This application incorporates U.S. Provisional Application, Ser. No. 61/885,957 and U.S. Provisional Application, Ser. No. 61/886,031 in their entireties by reference.

FIELD OF THE INVENTION

The present invention is generally directed to the field of springs and delivery mechanisms that utilize springs. More specifically, the present invention is directed to a telescoping spring and a delivery mechanism that utilizes the telescoping spring.

BACKGROUND OF THE INVENTION

A spring is typically made of a wire formed helically into coils, and the spring has an elastic property defined as the spring constant K. In a compression spring, the free length of the spring is the length of the spring in a relaxed state, or uncompressed, that is the spring with no external compression force applied. A maximum compression of the spring is referred to as the solid height of the spring. The solid height is the length of the compressed spring under sufficient load to bring all coils into contact with adjacent coils. However, a spring has a maximum elasticity point that is less than its solid height. If the spring is compressed beyond its maximum elasticity point, then the spring begins to lose its elastic properties. Therefore, in order to maintain the spring constant K, the spring should not be compressed beyond its maximum elasticity point. Springs are used in many applications, including the use as drivers for plungers. It is a frequent design consideration for the driver to be as small as possible.

SUMMARY OF THE INVENTION

Embodiments of the telescoping spring are directed to a delivery system used to drive a plunger. The telescoping spring includes a nested inner spring that uses the unused volume on the inside of an outer spring. In some embodiments, the telescoping spring has a staged release of each spring. In some embodiments, the outer spring releases first, and as it approaches its free length, the inner spring is released. The inner spring is connected to a non-anchored end of the outer spring, and rides within a container located within an inner dimension of the outer spring. An objective is to maximize an effective length of the released springs in the relaxed state, and minimize the effective length while compressed as nested springs in a loaded state. In some embodiments, the spring constant K of each spring is the same. In other embodiments, the spring constant K of each spring is different. In some embodiments, the delivery system is fully mechanical. In other embodiments, the delivery system includes electronics, as in a smart delivery system. In an exemplary application, the spring is coupled to the plunger of a syringe. The smart delivery system can be used for time release of the contents within the syringe, for example to allow the body to better absorb a drug being administered using the syringe. Such an implementation can also include a second stage configured to be deployed at a specific time, for example to deliver the drug at a different rate.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a delivery system having a telescoping spring. Those of ordinary skill in the art will realize that the following detailed description of the delivery system is illustrative only and is not intended to be in any way limiting. Other embodiments of the delivery system will readily suggest themselves to such skilled persons having the benefit of this disclosure.

Reference will now be made in detail to implementations of the delivery system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
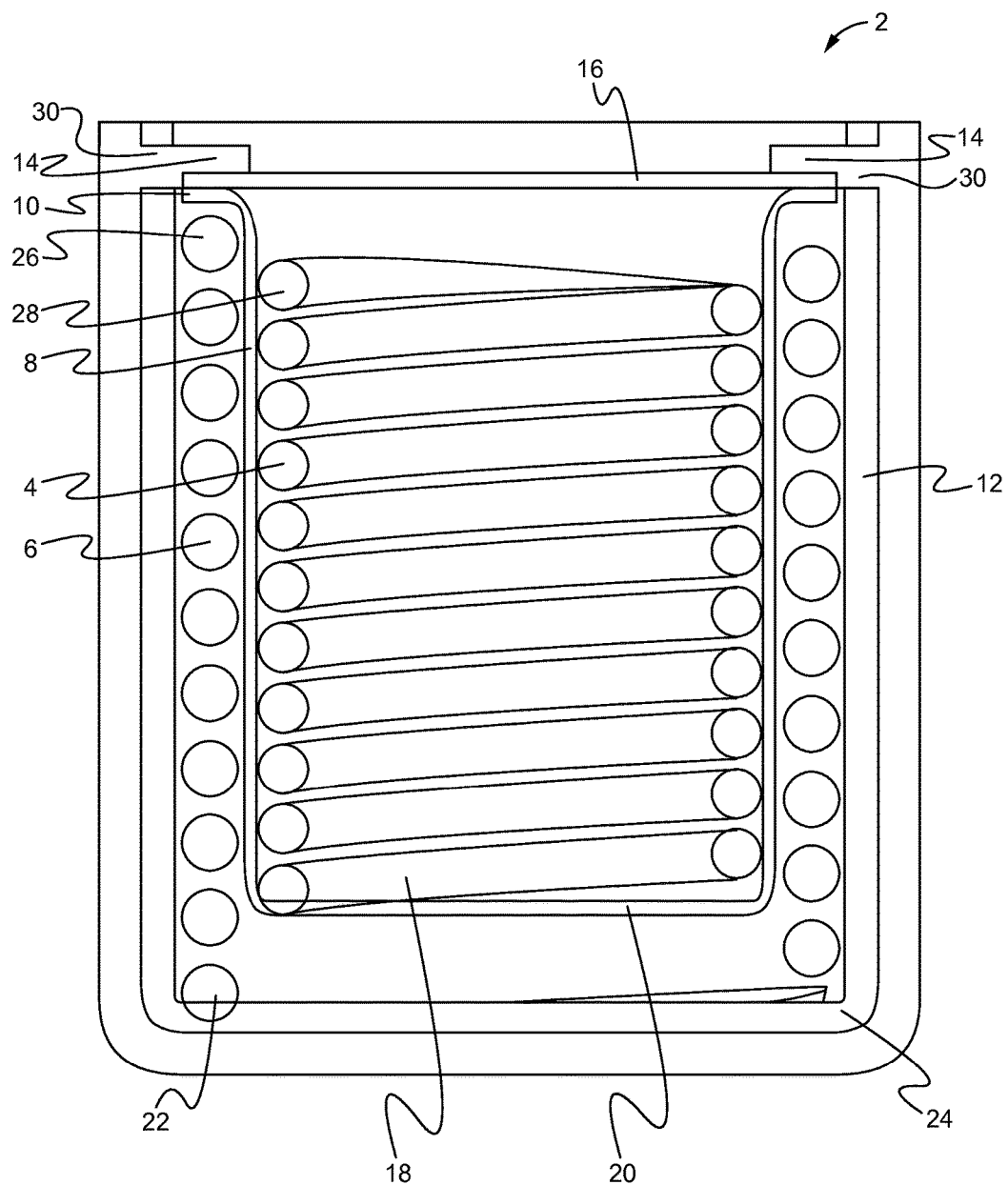
FIG. 1 illustrates a cut out side view of a delivery system according to an embodiment.
Figure 2:
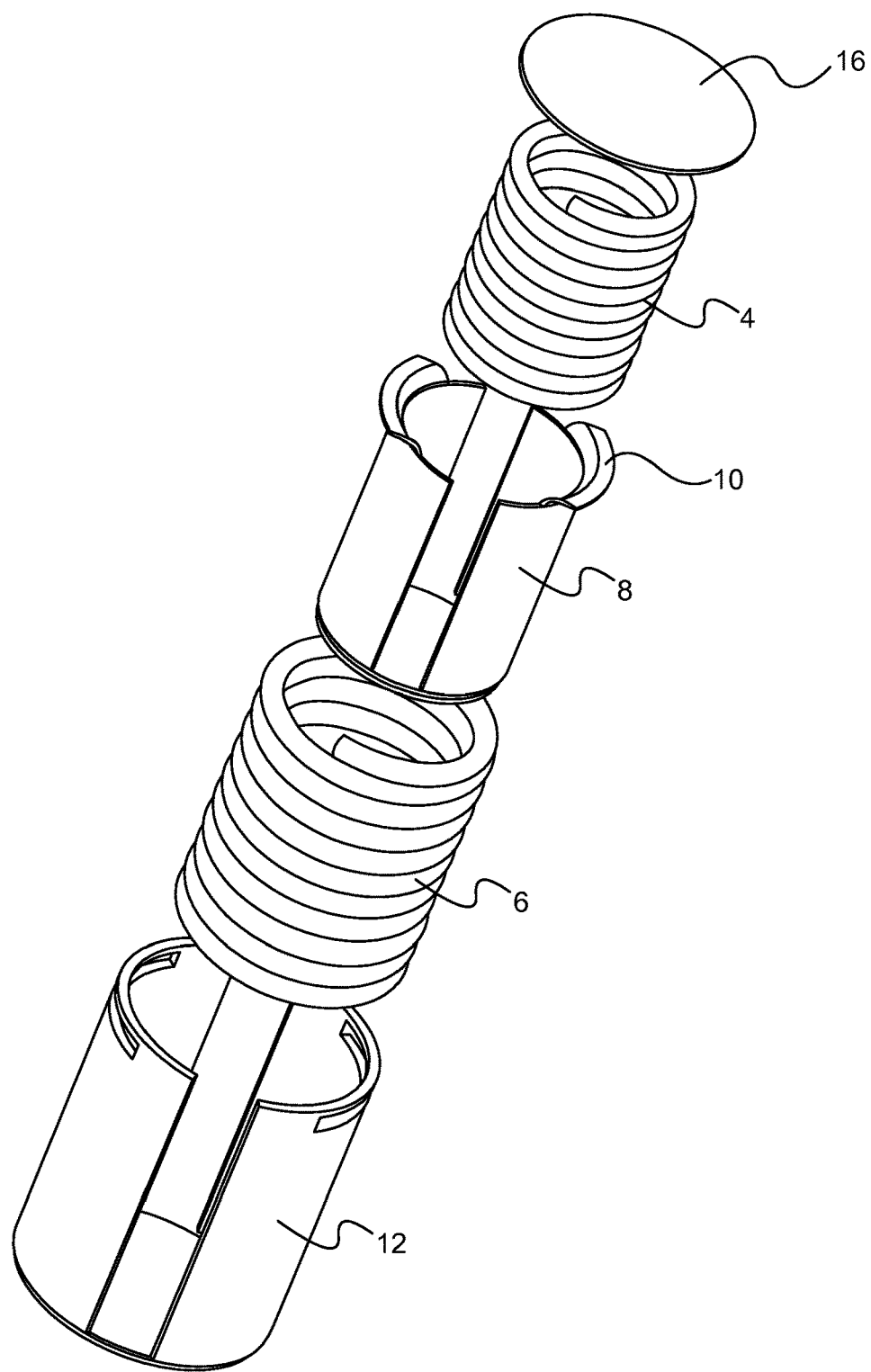
FIG. 2 illustrates an exploded view of the inner spring, the outer spring, the container, the spring housing and a plate.

FIG. 1 illustrates a cut out side view of a delivery system 2 in a loaded state according to an embodiment. The delivery system 2 includes an inner spring 4 nested within an inner diameter of an outer spring 6. A container 8 is positioned within the inner diameter of the outer spring 6, and the inner spring 4 is positioned within the container 8. FIG. 2 illustrates an exploded view of the inner spring 4, the outer spring 6, the container 8, the spring housing 12 and a plate 16. Referring again to FIG. 1, a first end 18 of the inner spring 4 rests against a bottom side 20 of the container 8. In some embodiments, the first end 18 is fixed to the bottom side 20. In other embodiments, the inner spring 4 is free floating relative to the container 8. The outer spring 6 is positioned within a spring housing 12. A first end 22 of the outer spring 6 rests against a bottom side 24 of the spring housing 12. In some embodiments, the first end 22 is fixed to the bottom side 24. In other embodiments, the outer spring 6 is free floating relative to the spring housing 12. The container 8 includes a container lip 10 that extends over a second end 26 of the outer spring 6. In some embodiments, the container lip 10 extends around an entire circumference of the container 8. In other embodiments, the container lip 10 is a plurality of separated sections, such as the two section embodiment shown in FIGS. 2 and 3.

The plate 16 is positioned proximate a second end 28 of the inner spring 4. In some embodiments, the plate 16 rests on the second end 28 of the inner spring 4 while the delivery system 2 is in the loaded state. In other embodiments, the plate 16 does not rest directly against the second end 28 while the delivery system 2 is in the loaded state, as shown in FIG. 1. In some embodiments, the plate 16 rests on the container lip 10 of the container 8, as shown in FIG. 1. In other embodiments, the plate 16 does not extend over and rest on the container lip 10. One or more outer spring release prongs 14 are positioned over the second end 26 of the outer spring 6 so as to hold the outer spring 6 in the loaded state. In the embodiment shown in FIG. 1, the outer spring release prongs 14 rest against the plate 16. In some embodiments, the outer spring release prongs 14 rest against the container lip 10. In other embodiments, the outer spring release prongs 14 rest against the second end 26 of the outer spring 6. In some embodiments, the spring housing 12 includes one or more openings 30 through which the outer spring release prongs 14 move in to secure the outer spring 6 in the loaded state, as shown in FIG. 1, and to move out to release the outer spring 6, as described in detail below. In other embodiments, the outer spring release prongs 14 are aligned so as to move in and out over a top edge of the spring housing. One or more inner spring release prongs, not shown in FIG. 1, are positioned over the second end 28 of the inner spring 4 so as to hold the inner spring 4 in the loaded state. The inner spring release prongs are described in more detail below. Exemplary embodiments of the inner spring release prongs are shown in FIGS. 8-15.

In the loaded state shown in FIG. 1, the inner spring release prongs are engaged to hold the inner spring 4 compressed in the loaded state and the outer spring release prongs 14 are engaged to hold the outer spring 6 compressed in the loaded state. In the loaded state, each spring can be compressed to any point less than the free length of the spring and as great as the maximum elasticity point of the spring. In an exemplary application, each spring is compressed to its maximum elasticity point so as to minimize the size of the delivery system in the loaded state.

Figure 3:
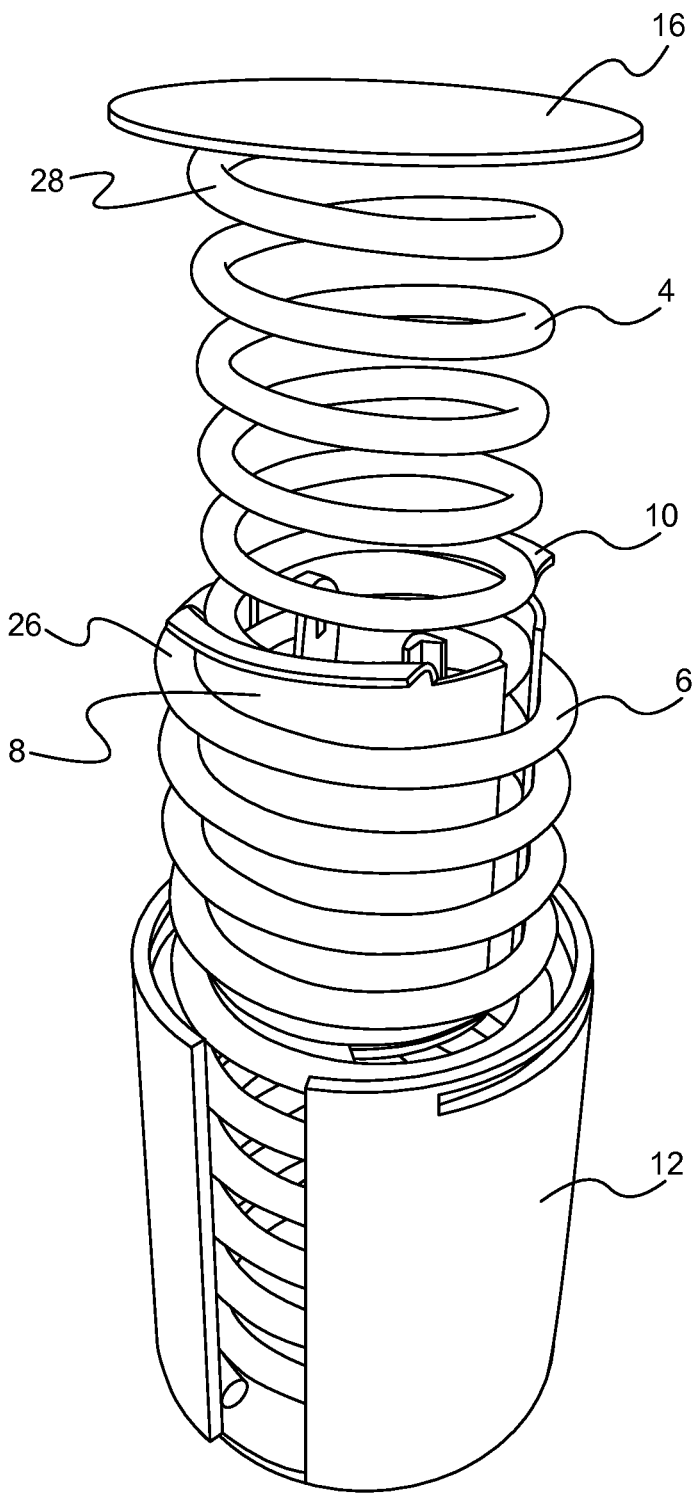
FIG. 3 illustrates a perspective view of the delivery system in a relaxed state according to an embodiment.

FIG. 3 illustrates a perspective view of the delivery system 2 in a relaxed state according to an embodiment. The relaxed state corresponds to both the inner spring release prongs (not shown) and the outer spring release prongs (not shown) having been released and both the inner spring 4 and the outer spring 6 extending to their free lengths. FIG. 3 shows the effective length of the released springs in the relaxed state. When the outer spring release prongs 14 (FIG. 1) are disengaged, the outer spring 6 is released from the loaded state and extends to its free length. The spring housing 12 is fixed and as the outer spring 6 extends, the second end 26 extends out of the spring housing 12, moving the container 8 and the plate 16 as the container lip 10 extends over the moving second end 26. Once the outer spring 6 extends to, or near, its free length, the inner spring release prongs (not shown) are disengaged, thereby releasing the inner spring 4 from the loaded state and the inner spring 4 extends to its free length. The container 8 is held substantially in place by the spring force of the outer spring 6, and the second end 28 of the inner spring 4 extends out of the container 8, moving the plate 16 away from the container 8.

Figure 4:
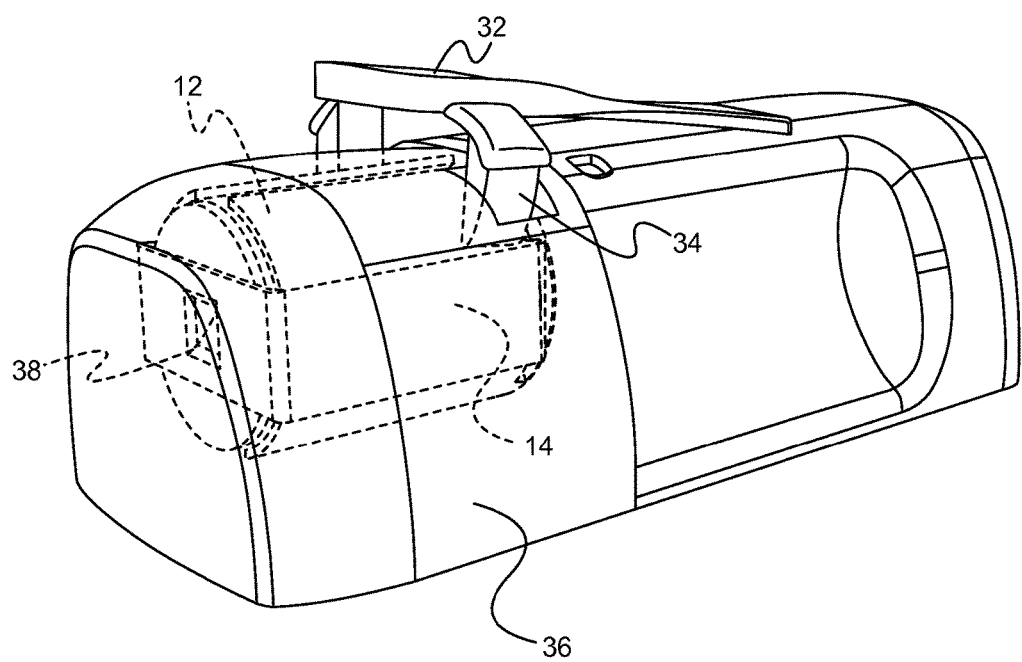
FIG. 4 illustrates a perspective view of the delivery system including a mechanical mechanism in a disengaged position according to an embodiment.
Figure 6:
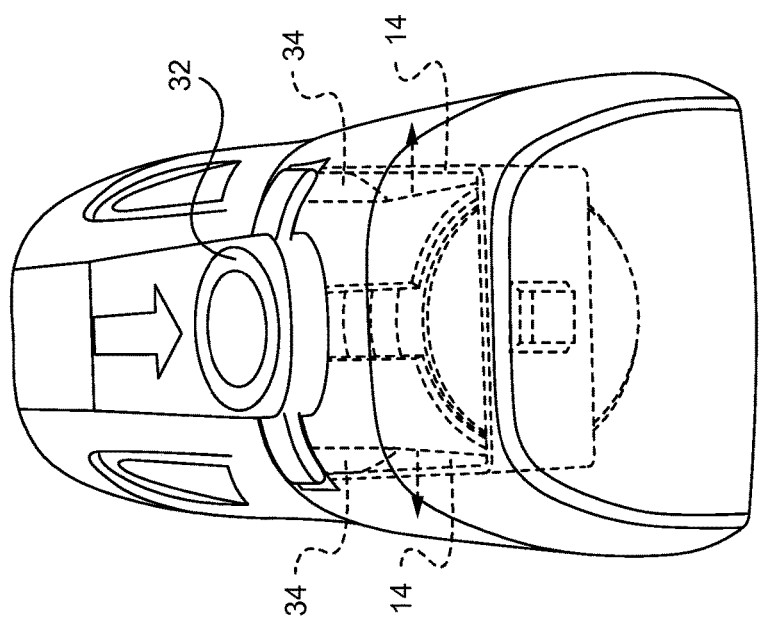
FIG. 6 illustrates another perspective view of the delivery system shown in FIG. 4.

In some embodiments, the delivery system is fully mechanical. A mechanical implementation includes a mechanical mechanism for disengaging the outer spring release prongs 14 and the inner spring release prongs. FIG. 4 illustrates a perspective view of the delivery system including a mechanical mechanism in a disengaged position according to an embodiment. The delivery system shown in FIG. 4 includes a transparent device housing 36 to illustrate both a relative position of an activation button 32 on an external surface of the device housing 36 and an engagement of the activation button 32 with the outer spring release prongs 14 within the device housing 36 The activation button 32 is positioned on the external surface of the device housing 36 for access by a user. The activation button 32 is coupled to a set of wedges 34. The wedges 34 extend between the outer spring release prongs 14 and the spring housing 12. FIG. 6 illustrates another perspective view of the delivery system shown in FIG. 4. In the disengaged position, only a portion of the wedges 34 are positioned between the outer spring release prongs 14 and the spring housing 12 such that the outer spring release prongs remain in the engaged position holding the outer spring 6 compressed.

Figure 5:
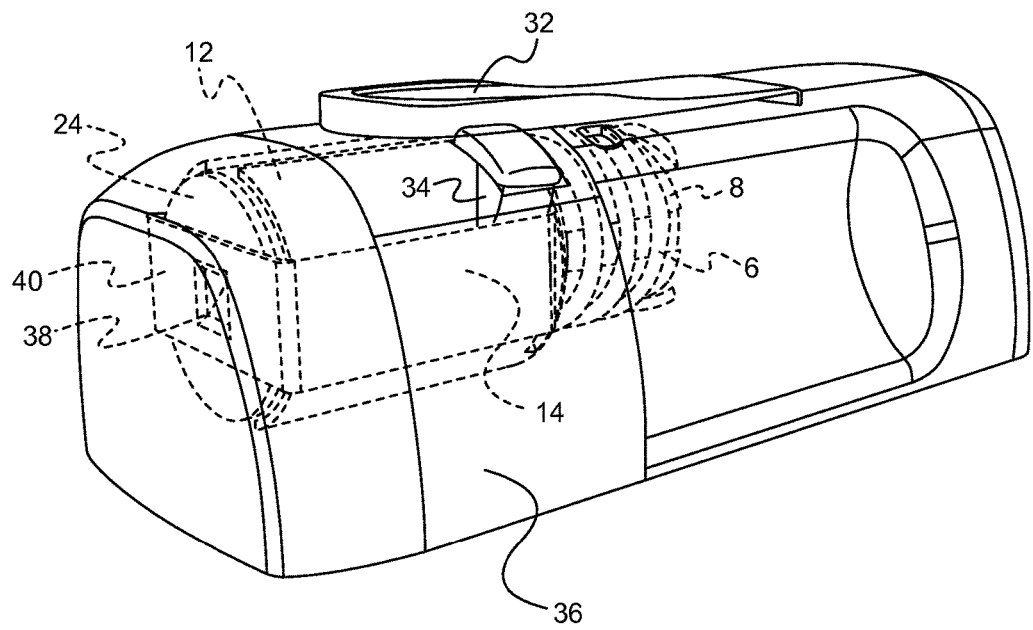
FIG. 5 illustrates the delivery system including the mechanical mechanism in an engaged position.
Figure 7:
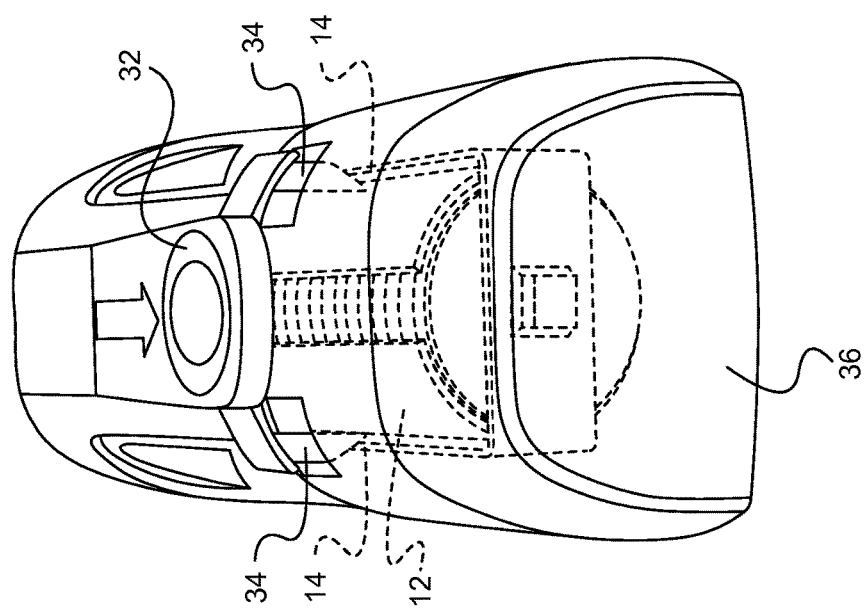
FIG. 7 illustrates another perspective view of the delivery system shown in FIG. 5.

When the activation button 32 is depressed, the wedges 34 are forced further between the outer spring release prongs 14 and the spring housing 12 thereby forcing the outer spring release prongs outward away from the spring housing 12. FIG. 5 illustrates the delivery system including the mechanical mechanism in an engaged position. In this case, the activation button 32 is pushed inward toward the device housing, thereby forcing the wedges 34 further between the outer spring release prongs 14 and the spring housing 12. FIG. 7 illustrates another perspective view of the delivery system shown in FIG. 5. As the wedges 34 are forced between the outer spring release prongs 14 and the spring housing 12, the outer spring release prongs 14 are forced away from the spring housing 12 as shown in FIG. 7 thereby disengaging the outer spring release prongs 14 and releasing the outer spring 6, as shown in FIG. 5.

A secondary mechanical mechanism is used to disengage the inner spring release prongs. In the exemplary embodiment shown in FIGS. 4-7, the outer spring release prongs 14 are configured as a band that includes a bottom section 40 extending around the bottom surface 24 of the spring housing 12. The bottom section 40 and the bottom surface 24 include an opening 38 through which a center cord (not shown) extends. A first end of the center cord can be secured to the inside of the device housing or other anchor proximate the opening 38. The other end of the center cord is attached to the inner spring release prongs. When pulled taught, the center cord pulls on the inner spring release prongs thereby disengaging the inner spring release prongs and releasing the inner spring. An exemplary configuration of the center cord is shown in FIGS. 10-15. It is understood that other types and configurations of mechanical mechanisms can be used to disengage the outer spring release prongs and the inner spring release prongs.

Figure 8:
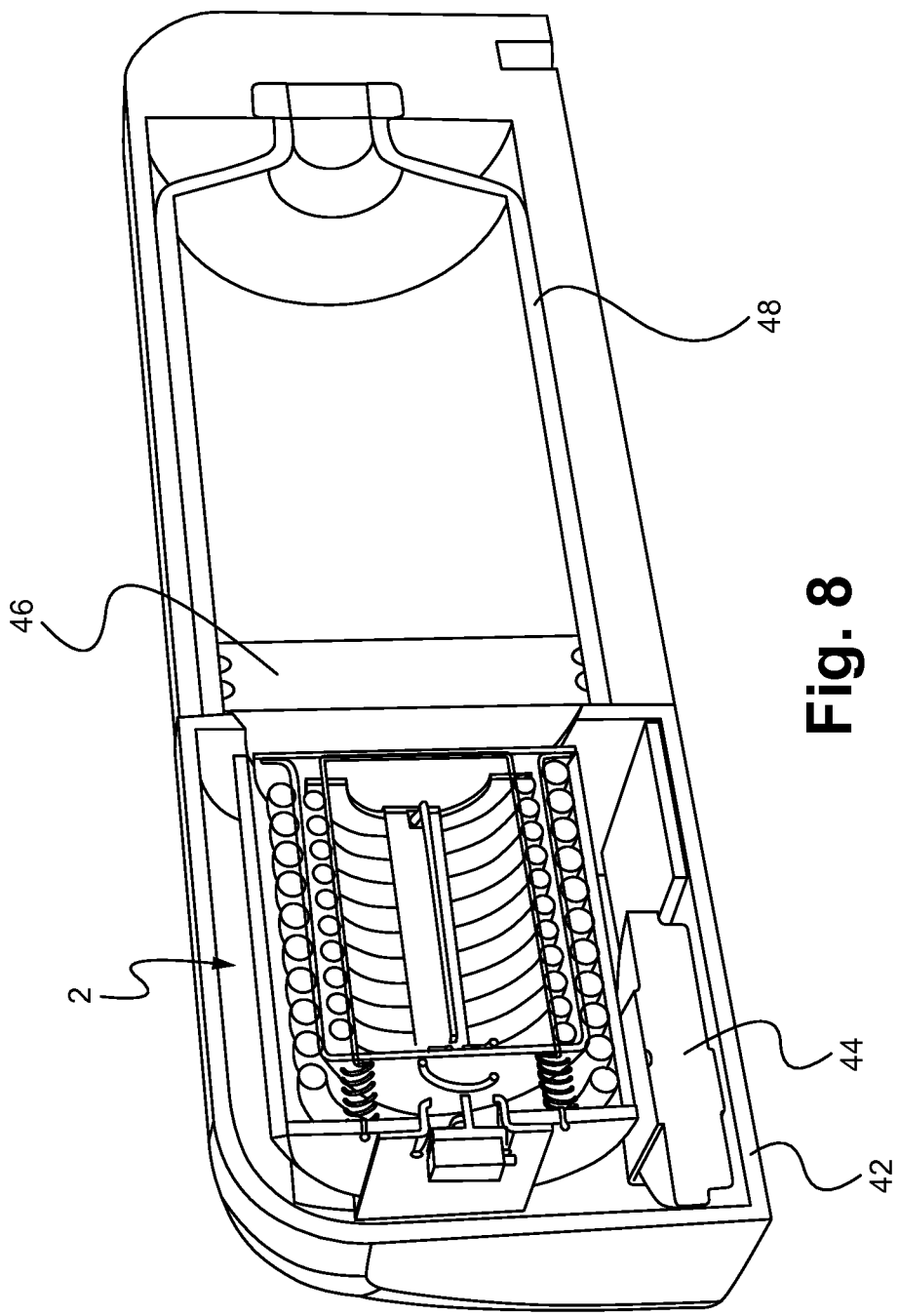
FIG. 8 illustrates a vertical cross-section of a delivery system including electronics in a loaded state according to an embodiment.
Figure 9:
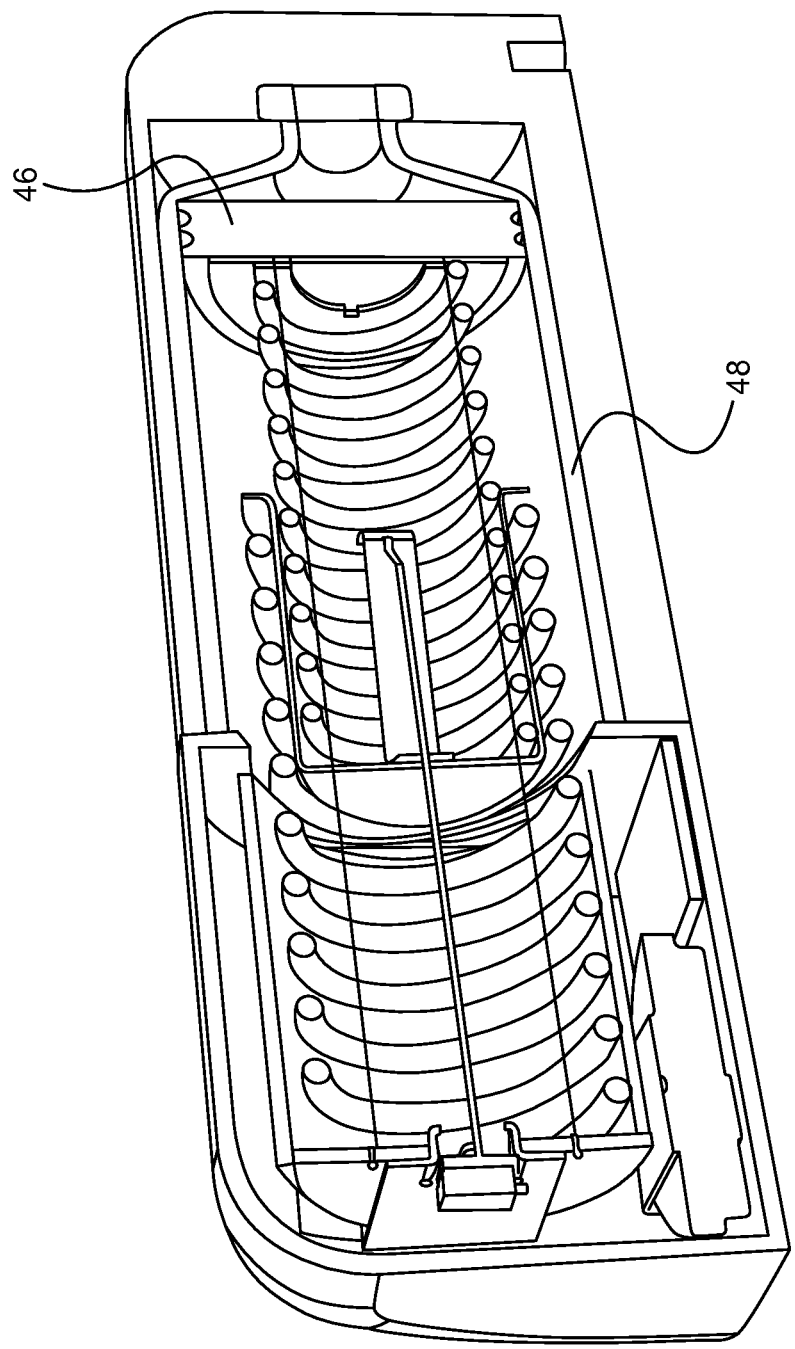
FIG. 9 illustrates a vertical cross-section of a delivery system including electronics in a relaxed state according to an embodiment.

In other embodiments, the delivery system includes electronics, as in a smart delivery system. FIG. 8 illustrates a vertical cross-section of a delivery system including electronics in a loaded state according to an embodiment. The delivery system 2 is positioned within a device housing 42. In the exemplary configuration shown in Figure, the delivery system 2 includes a vial 48 and a plunger 46 positioned within the vial 48. The plate 16 (FIG. 1) is coupled to the plunger 46. The delivery system 2 also includes an electronic module 44 including a power source, such as a battery, and control electronics. The control electronics can be activated by a control button (not shown) positioned on the device housing 42 and coupled to the electronic module 44. Upon activation by the control button, the outer spring release prongs and the inner spring release prongs are selectively disengaged by electrical control, thereby releasing the outer spring and the inner spring as shown in FIG. 9. Release of the outer spring and the inner spring forces the plunger 46 into the vial 48 thereby forcing the contents of the vial 48 out the vial output 50. In an exemplary application, a needle (not shown) is coupled to the vial output 50. It is understood that the mechanical implementation of the delivery system 2, such as that shown in FIGS. 4-7, can similarly be coupled to a vial and plunger such as that shown in FIGS. 8 and 9.

Figure 10:
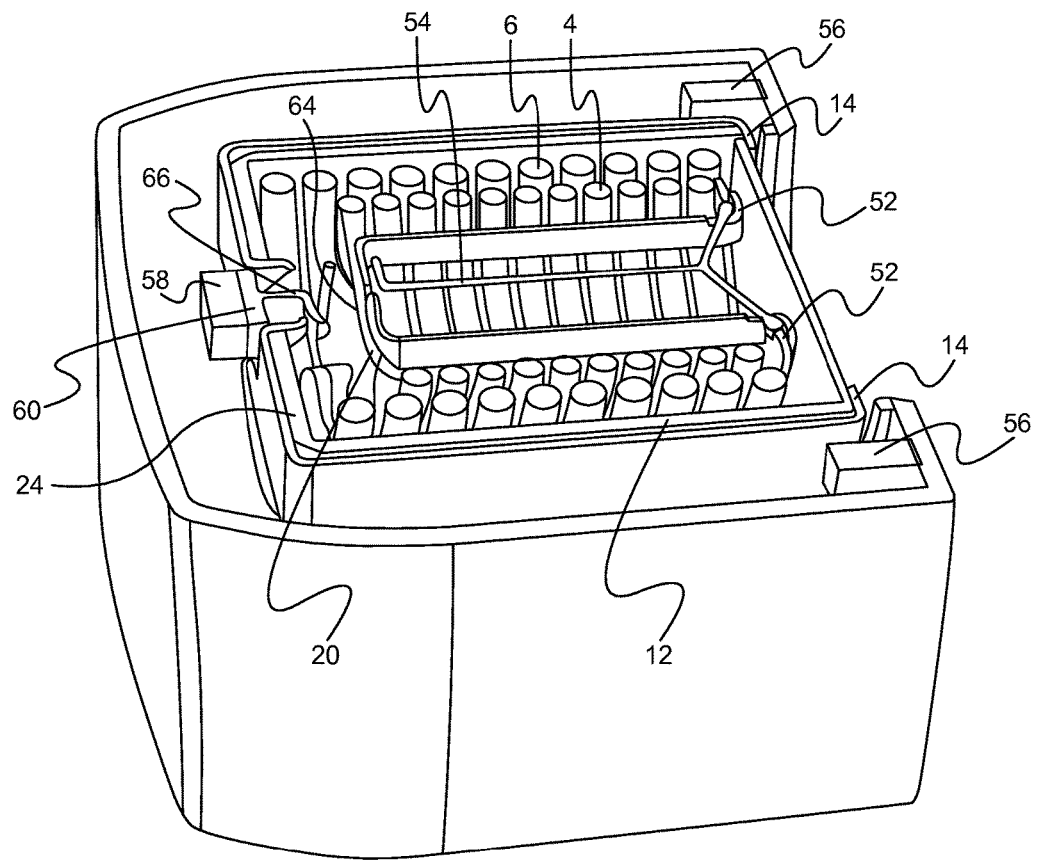
FIG. 10 illustrates a horizontal cross-section of the delivery system of FIG. 8 with the vial and plunger removed.
Figure 11:
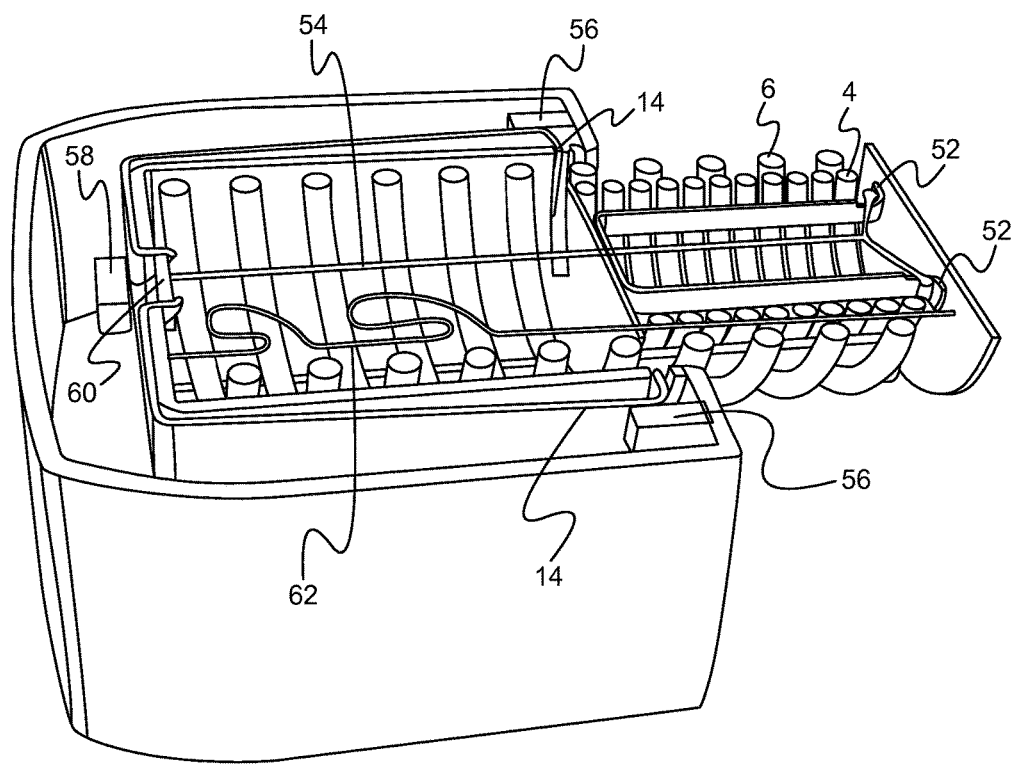
FIG. 11 illustrates a horizontal cross-section of the delivery system including electronics after the outer spring is released.
Figure 13:
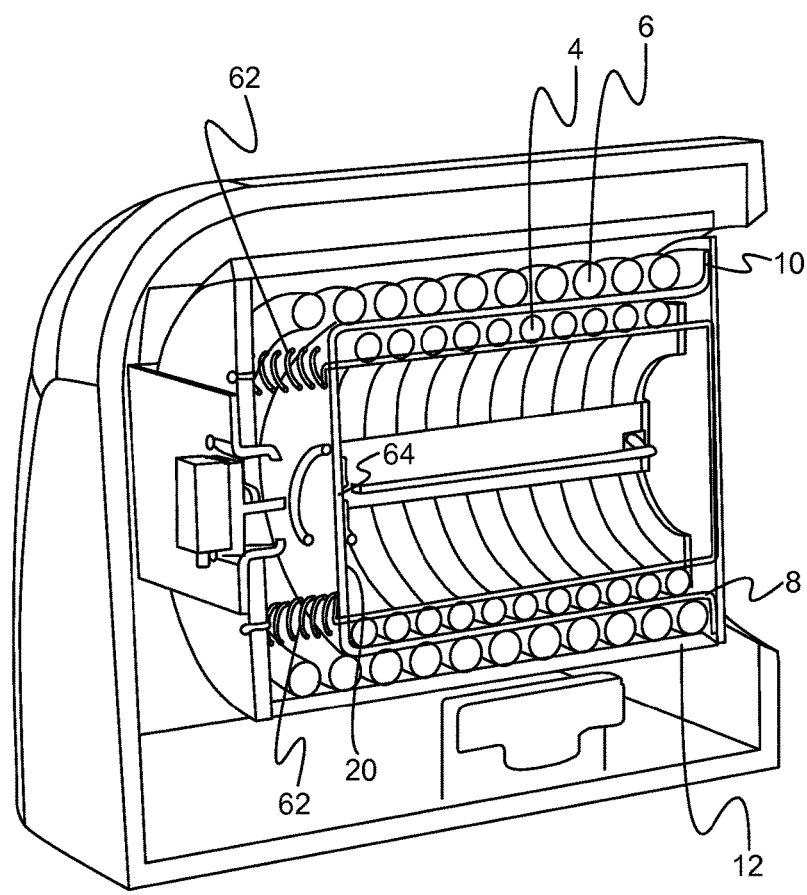
FIG. 13 illustrates a vertical cross-section of the delivery system of FIG. 8 with the via and plunger removed.

FIG. 10 illustrates a horizontal cross-section of the delivery system 2 of FIG. 8 with the vial and plunger removed. FIG. 13 illustrates a vertical cross-section of the delivery system 2 of FIG. 8 with the via and plunger removed. The electronic module 44 (FIG. 8) is electrically coupled to a plurality of electromagnets 58 and 56. When an electric current is applied to the electromagnets, the electromagnets become magnetized. Application of the electric current is controlled by the electronic module 44. In this embodiment, the outer spring release prongs 56 are made of magnetic material, such as a metal, that is magnetically attracted to the magnetized electromagnet 56. An electromagnet 56 is positioned proximate to each outer spring release prong 56 such that when the electromagnets 56 are magnetized, the outer spring release prongs 14 are magnetically attracted to the electromagnets 56, thereby moving the outer spring release prongs 14 and releasing the outer spring 6, as shown in FIG. 11.

The inner spring 4 is maintained in a compressed state by inner spring release prongs 52. When engaged, a portion of the inner spring release prongs 52 extend over the second end 28 of the inner spring 4. A first end of a center cord 54 is attached to the inner spring release prongs 52. In the exemplary configuration shown in FIG. 10, the center cord 54 branches into two first ends, one first end attached to each of two inner spring release prongs 52. The center cord 54 extends from the inner spring release prongs 52 through an opening 64 in the bottom side 20 of the container 8 and through an opening 66 in the bottom side 24 of the spring housing 12 and a second end of the center cord 54 is attached to a plate 60. In some embodiments, the plate 60 is made of magnetic material, such as a metal. The plate 60 is movable, but is larger in width than the opening 66 so that the plate 60 can not pass through the opening 66. In the compressed state shown in FIGS. 10 and 11, at least a portion of the center cord 54 is slack. When the outer spring 6 is released, the center cord 54 becomes taught when the outer spring 6 reaches its relaxed state. While taught, the center cord 54 pulls on the plate 60 to move the plate 60 against the opening 66, as shown in FIG. 11.

Figure 12:
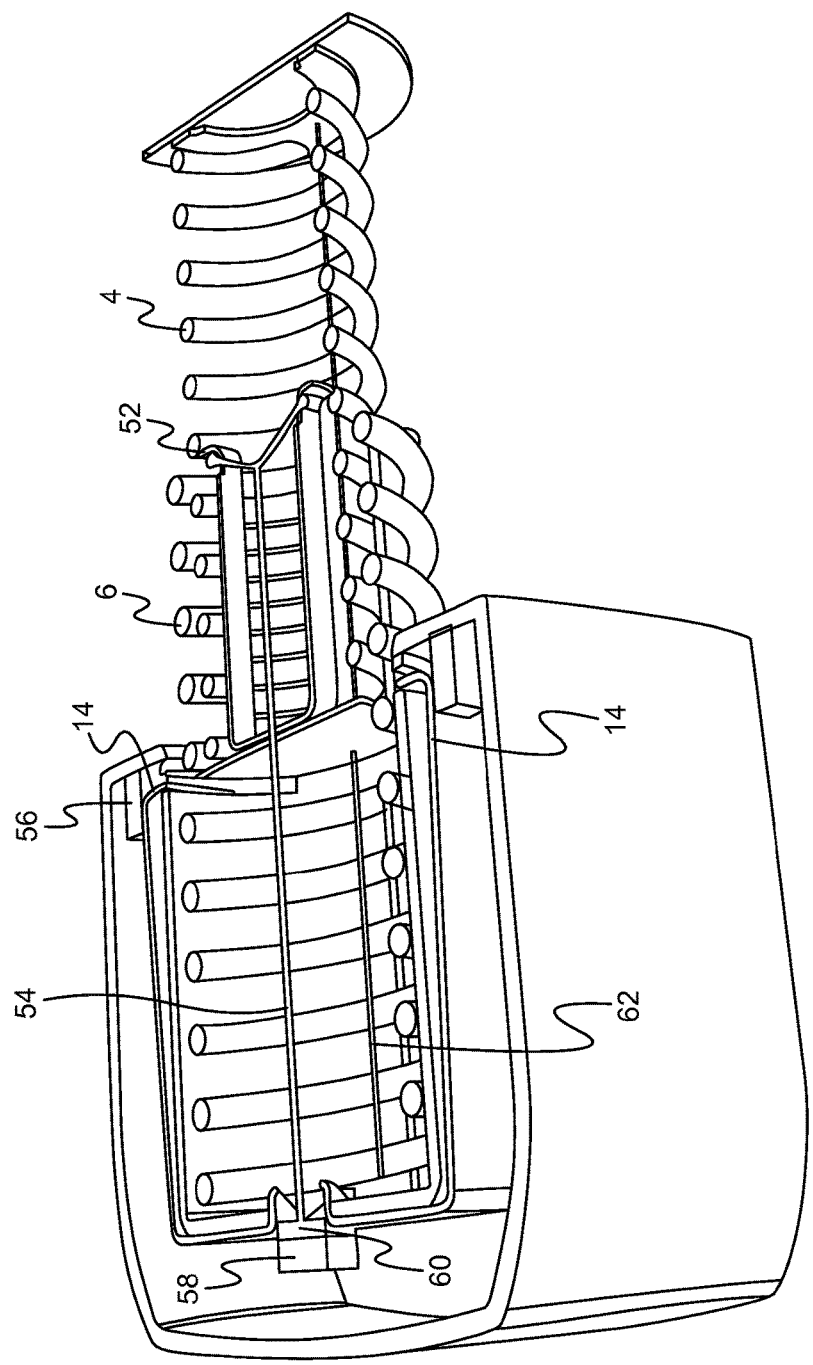
FIG. 12 illustrates a horizontal cross-section of the delivery system including electronics after the outer spring and the inner spring are released.

The electromagnet 58 is positioned proximate to the plate 60 such that when the electromagnet 58 is magnetized, the plate 60 is magnetically attracted to the electromagnet 58, thereby pulling the center cord 54, which pulls inward the inner spring release prongs 52 and releases the inner spring 4, as shown in FIG. 12. The electromagnet 58 is fixed in position. In some embodiments, the electromagnet 58 is fixed to an inner surface of the device housing. In some embodiments, the electric current supplied to the electromagnets 56 is discontinued once the outer spring 6 has reached its relaxed state, thereby conserving power as there is no longer a need to retract the outer spring release prongs 14. The electric current supplied to the electromagnets 56 can be discontinued before, during or after the release of the inner spring 4. Similarly, the electric current supplied to the electromagnet 58 can be discontinued once the inner spring 4 has reached its relaxed state, thereby conserving power as there is no longer a need to retract the inner spring release prongs 52.

Figure 14:
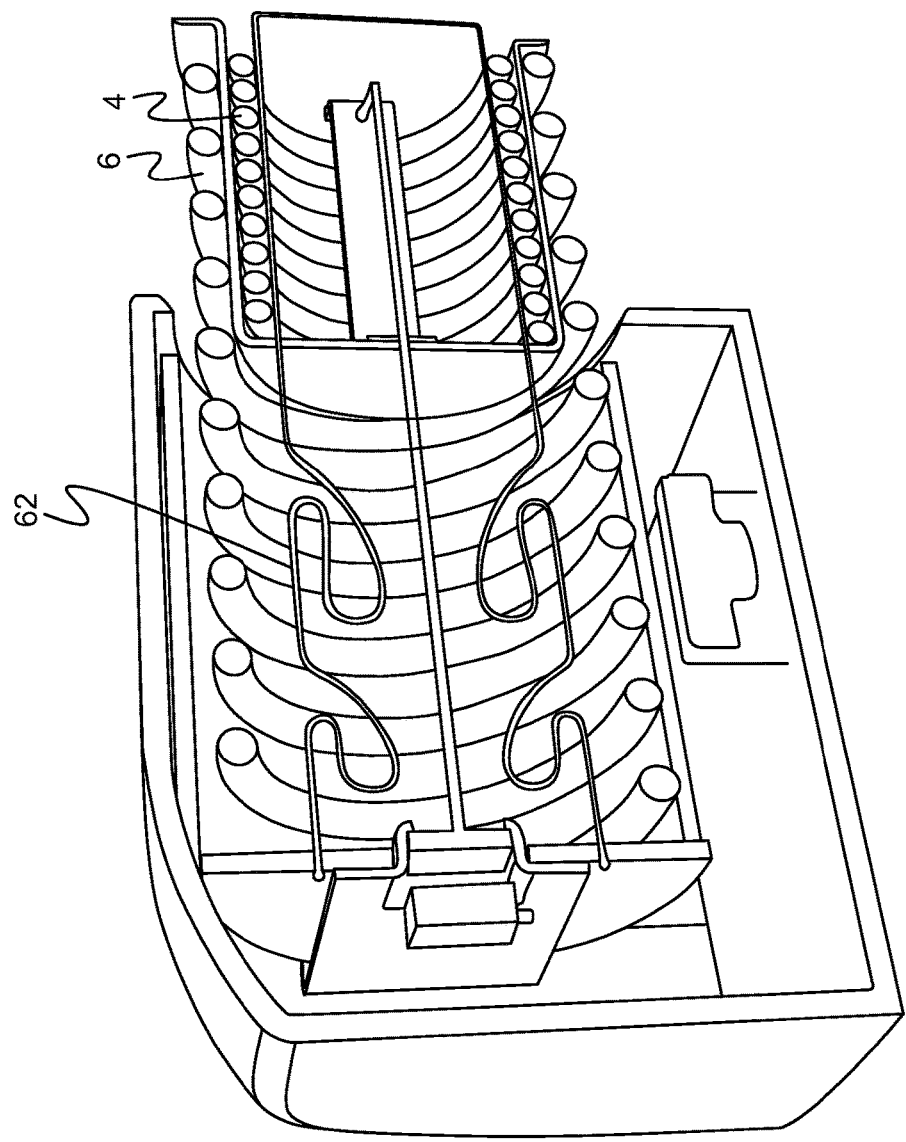
FIG. 14 illustrates a vertical cross-section of the delivery system including electronics after the outer spring is released.
Figure 15:
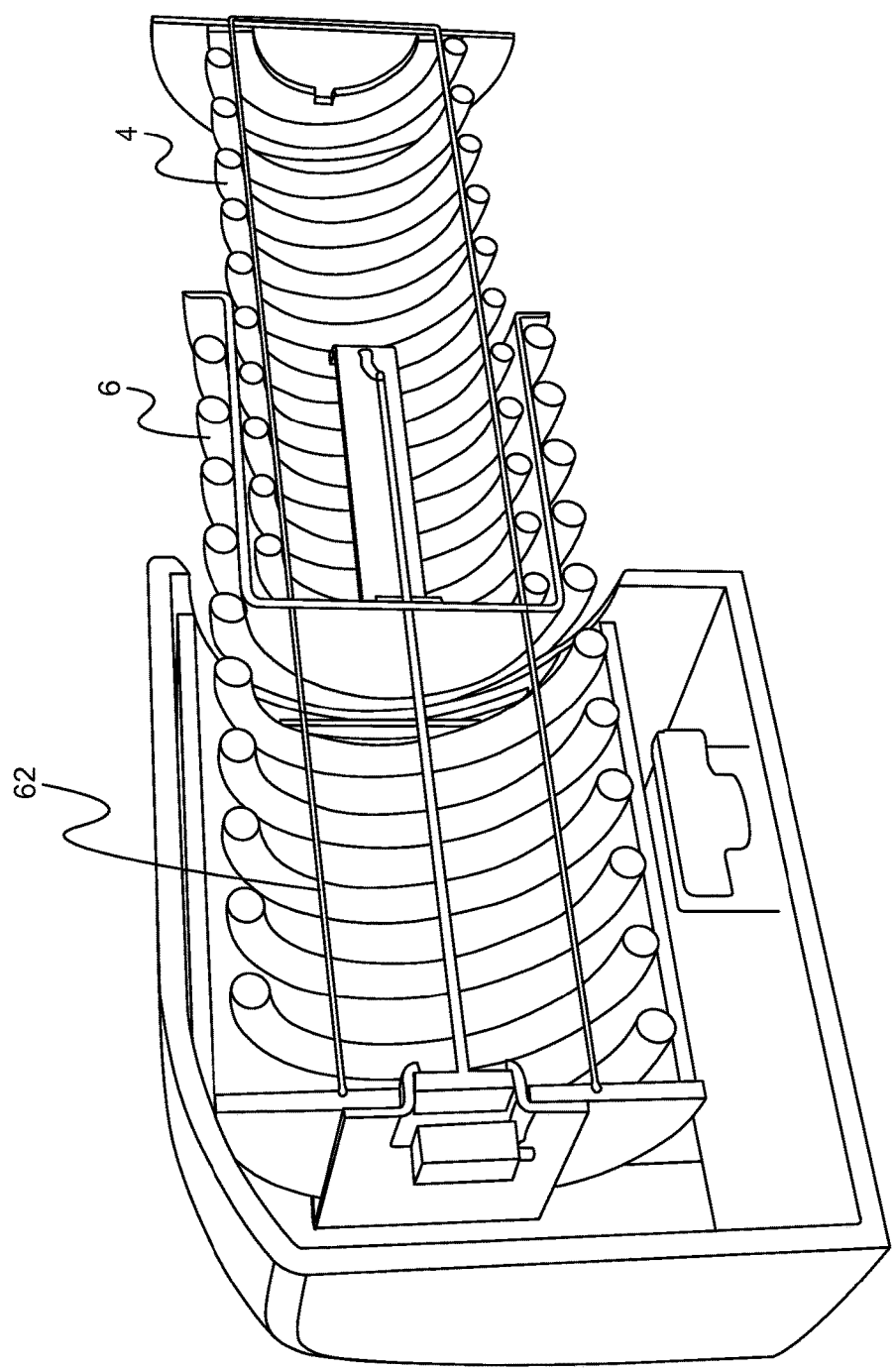
FIG. 15 illustrates a vertical cross-section of the delivery system including electronics after the outer spring and the inner spring are released.

In some embodiments, extension limiting cords are used to limit the combined length of extension of the inner and outer springs. FIG. 13 shows two extension limiting cords 62, each having slack while the delivery system is in the compressed state. As the outer spring 6 is released, the slack in the extension limiting cords 62 begins to be taken up, as shown in FIG. 14. The inner and outer springs reach their combined maximum extension length when the extension limiting cords 62 are taught, as shown in FIG. 15. The maximum extension length can be set to less than or equal to the length of the telescoping springs in the relaxed state.

The use of the center cord and inner spring release prongs shown in the electro mechanical implementation of FIGS.

10-15 can be similarly used in the mechanical implementation previously described. In the mechanical implementation, the second end of the center cord is attached to a fixed position, as opposed to the movable plate 60 in the electro mechanical implementation. The length of the center cord is set such that the center cord becomes taught prior to the outer spring fully extending to its relaxed state. Further extension of the outer spring to its relaxed states generates pull on the center cord to release the inner spring release prongs.

Figure 16:
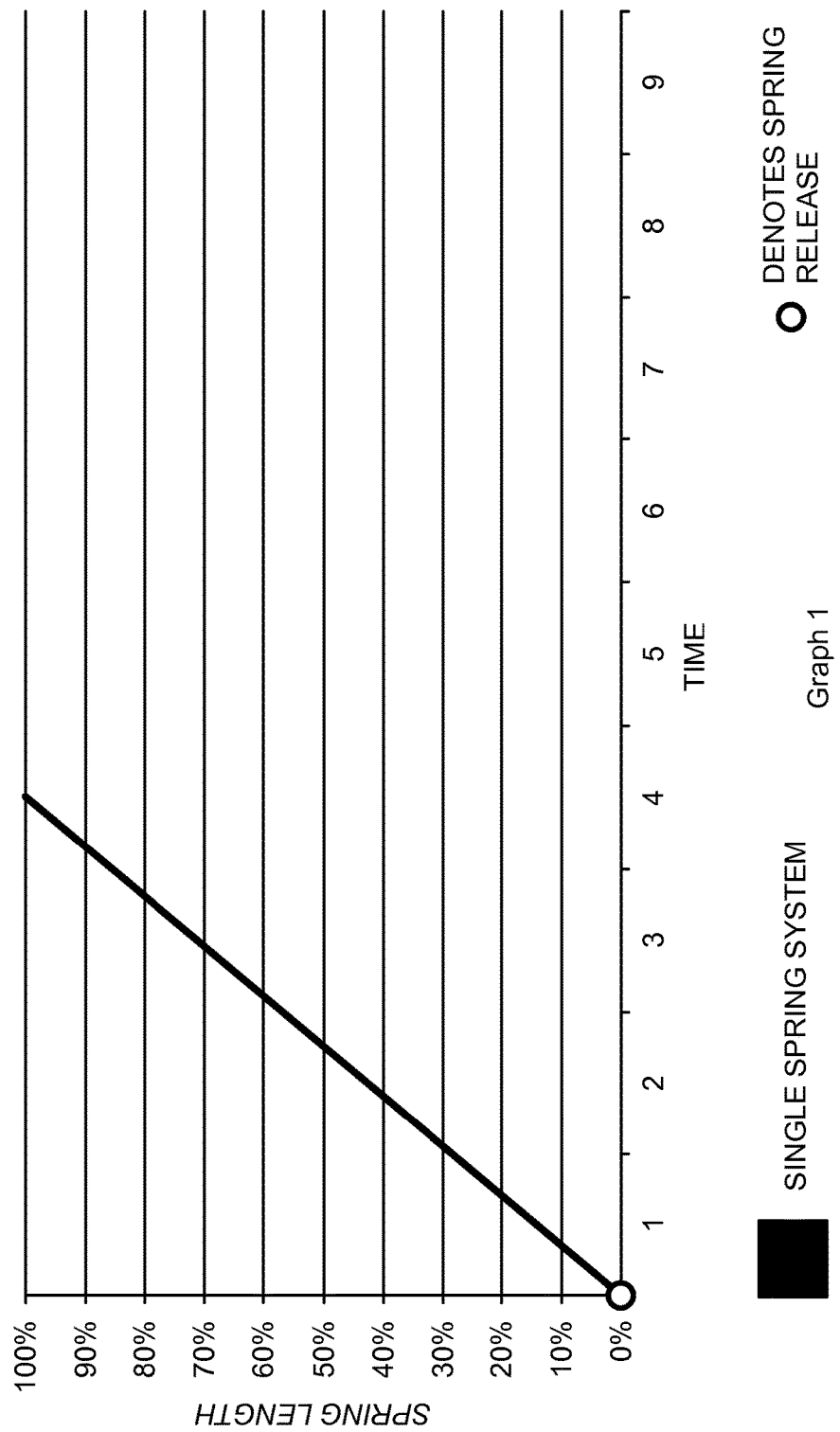
FIG. 16 illustrates a graph of a force function corresponding to an exemplary single spring system.

Releasing the inner and outer springs generates a force that is applied to the plate, which can in turn be applied, for example, to a plunger coupled to the plate. Movement of the plunger forces fluid, such as a drug dosage, out of the vial. The characteristics of the springs, such as the length and spring constant K, determines a force function delivered by the released springs. The force function in turn determines a delivery profile, which is the rate of volume delivery of the fluid within the vial. Each spring delivers a linear delivery profile indicative of a constant rate of volume delivery. FIG. 16 illustrates a graph of a force function corresponding to an exemplary single spring system. The force function is linear. The slope of the force function is determined by the spring constant K.

Figure 17:
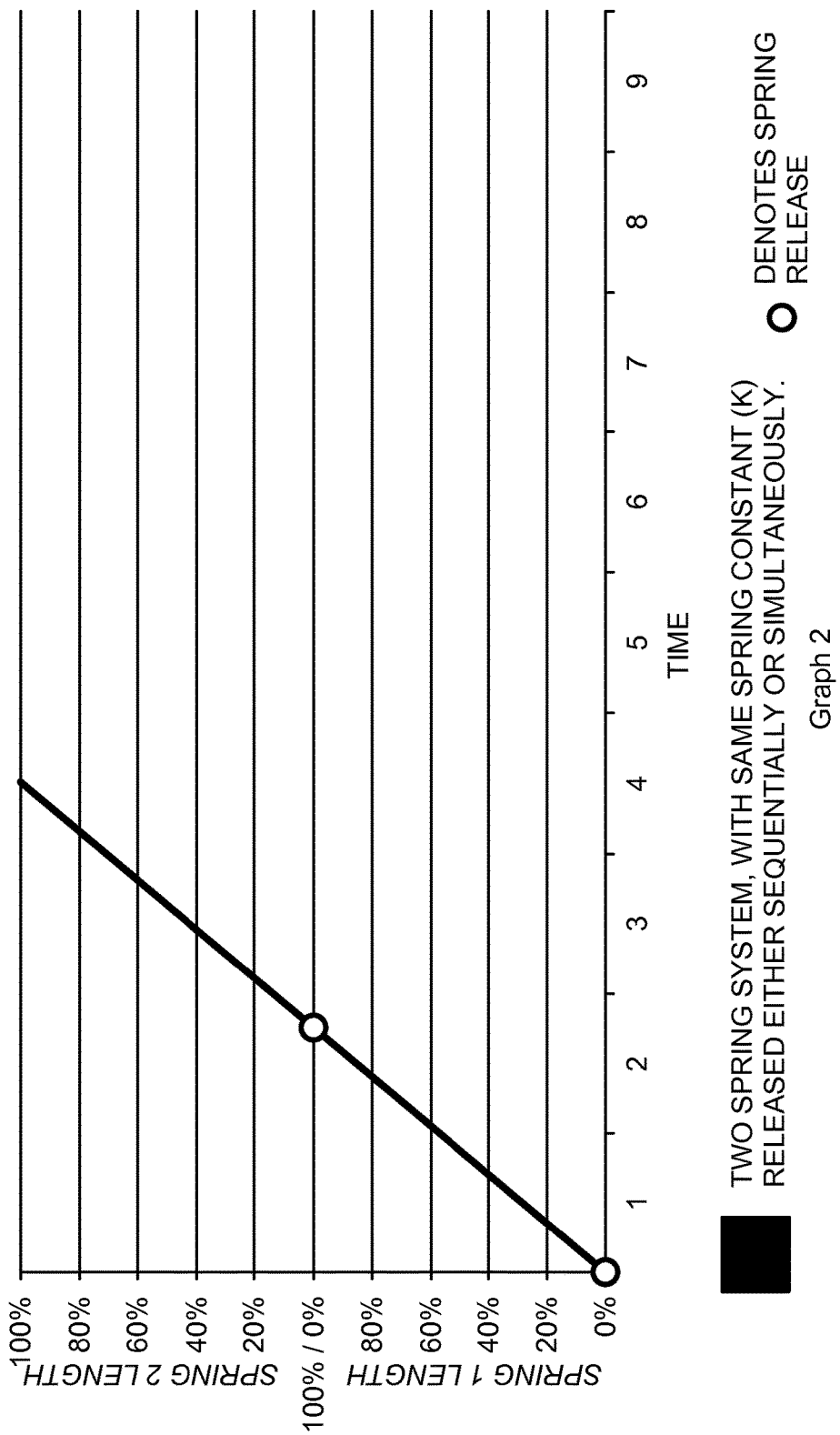
FIG. 17 illustrates a graph of a force function corresponding to an exemplary two spring system where the two springs have the same spring constant K.

FIG. 17 illustrates a graph of a force function corresponding to an exemplary two spring system, such as the delivery system shown in FIGS. 1-15, where the two springs have the same spring constant K. In this example where both the inner spring and the outer spring have the same spring constant K, the force function of each spring has the same slope. The overall force function is the same whether the springs are released sequentially, as previously described, or simultaneously. An analysis of the advantages of a timed/staged release vs. a simultaneously released approach resulted in the conclusion that the total force dissipated was the same if the springs release occurred simultaneously or in stages. Using springs with a lower spring constant would result in a less steep force function, which would length the time period over which the fluid is delivered. Conversely, using springs with a higher spring constant would result in a more steep force function, which would shorten the time period over which the fluid is delivered.

Figure 18:
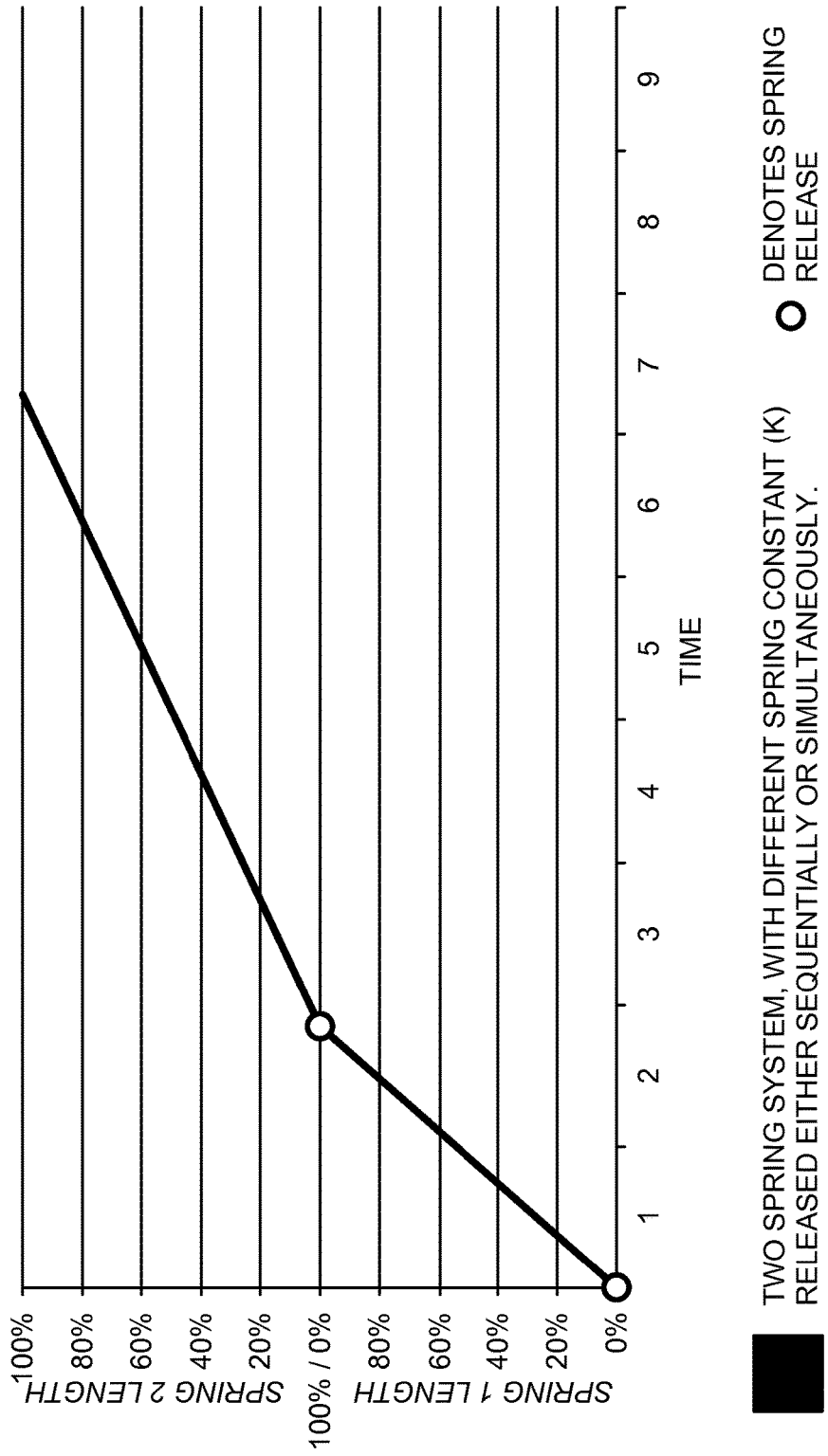
FIG. 18 illustrates a graph of a force function corresponding to an exemplary two spring system where the two springs have different spring constants K.

Springs can be used that have different spring constants. FIG. 18 illustrates a graph of a force function corresponding to an exemplary two spring system, such as the delivery system shown in FIGS. 1-15, where the two springs have different spring constants K. In this exemplary configuration, the outer spring has a larger spring constant K than the inner spring. The two different spring constants K results in a force function having two different slopes. When the first spring, which corresponds to the outer spring in this example, is released at time 0 the force function has a first slope, and when the second spring, which corresponds to the inner spring in the example, is released at about time 2 the force function has a second slope. The second slope is smaller than the first slope which results in a prolonged delivery time during release of the second spring. The slower delivery time during release of the second spring corresponds to a slower rate of delivery of the fluid in the vial.

Figure 19:
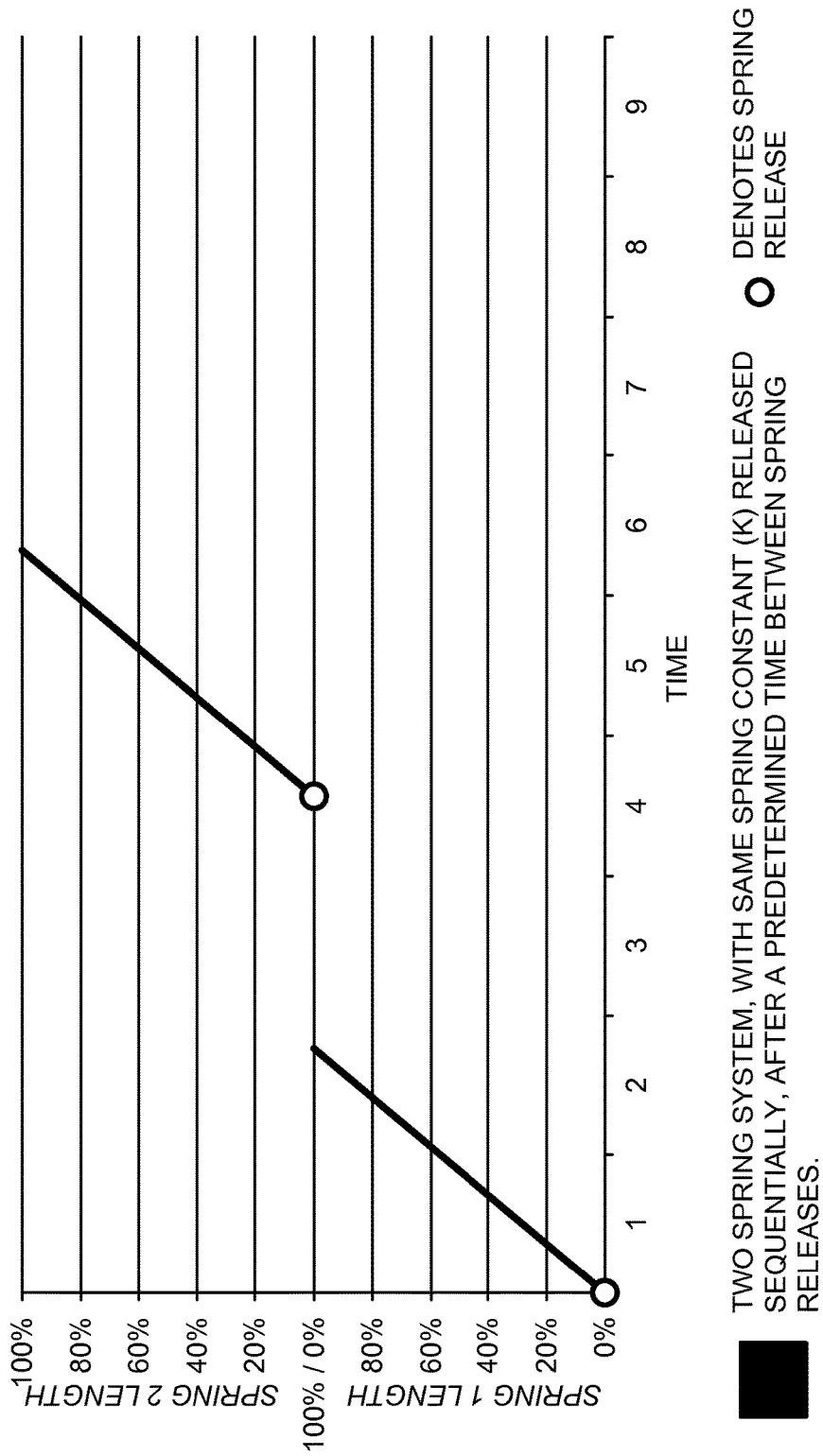
FIG. 19 illustrates a graph of a force function corresponding to an exemplary two spring system where the two springs have the same spring constant K and a delay is implemented.
Figure 20:
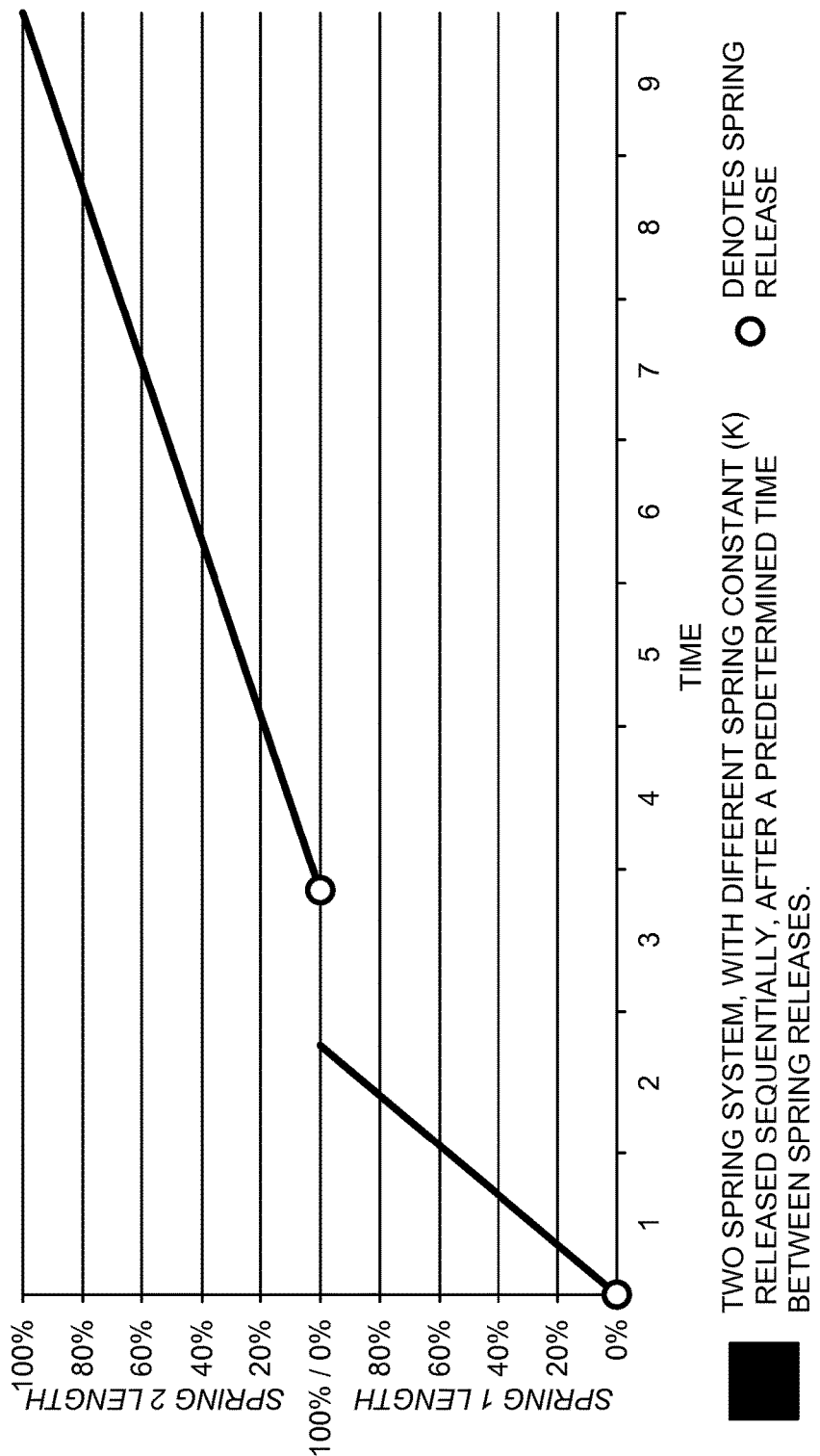
FIG. 20 illustrates a graph of a force function corresponding to an exemplary two spring system where the two springs have different spring constants K and a delay is implemented.

The telescoping spring of the delivery system is described above as releasing the outer spring first immediately followed by releasing the inner spring once the outer spring extends to its free length. Alternatively, the delivery system can be configured to provide a delay before releasing the inner spring. Such a delay can be programmed into the electronics module controlling the release of the inner spring release prongs. Using a delay enables modification of the force function and the resulting delivery profile of the fluid. The delay can be implemented in the case where both spring constants K are the same, as shown in the exemplary force function of FIG. 19, and the case where the spring constants K are different, as shown in the exemplary force function of FIG. 20.

The telescoping spring of the delivery system is described above as releasing the outer spring first followed by releasing the inner spring second. Alternatively, the delivery system can be configured where the sequence is reversed. In this case, the activation mechanism for releasing the inner spring and the outer spring is adapted for releasing the inner spring first and the outer spring second.

The delivery system is described above as implementing a single event for releasing the outer spring and a single event for releasing the inner spring. In this case, once the outer spring is released the outer spring extends completely to its free length, and once the inner spring is released the inner spring extends completely to its free length. Alternatively, releasing of the outer spring and releasing of the inner spring can be done in a series of release steps. For example, in the delivery system with electronics embodiment, the electronics module can be programmed to provide a series of control signals for sequentially activating the electromagnets, de-activating the electromagnets, activating the electromagnets, and so on. This results in a sequential engagement and disengagement of the corresponding release prongs, generating a ratcheting effect as the release prongs are sequentially engaged and disengaged with coils in the extending spring. When the spring is released, it begins to expand and the coils in the expanding spring pass by the disengaged release prongs. When the release prongs are re-engaged, the release prongs re-engage to the nearest coil in the spring, stopping the spring from further expanding until the release prongs are again disengage. In this manner, the spring can be allowed to expand one or more coils at a time before the release prongs are re-engaged. Such a methodology enables further modification of the force function and corresponding delivery profile. The delivery time can range from seconds to hours. Selective release of the springs as well as select spring constants K enables the delivery system to provide a variety of specific delivery profiles.

The delivery system having the telescoping spring provides many advantages. The delivery system can be re-usable or disposable. A size and form factor of the delivery system is reduced using the nested telescoping spring. A delivery profile, or rate of delivery, can be customized. The delivery profile can be configured to have a customized time release. The delivery system can utilize mechanical or electro-mechanical activation.

The present application has been described in terms of specific embodiments incorporating details to facilitate the understanding of the principles of construction and operation of the delivery system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A delivery system comprising:
   a. a spring housing;
   b. an outer spring positioned within the spring housing;
   c. a container positioned within the outer spring, wherein the container comprises one or more container lips extending from a first end of the container, further wherein the one or more container lips extend over a coil of the outer spring;
   d. an inner spring positioned within the container;
   e. a plate coupled to the inner spring;
   f. one or more outer spring release prongs coupled to the outer spring, wherein the one or more outer spring release prongs are configured to move between an engaged position where a portion of the one or more outer spring release prongs physically prevents the outer spring from moving and maintains the outer spring in a compressed state and a disengaged position where the portion of the one or more outer spring release prongs no longer physically prevents the outer spring from moving and the outer spring is released;
   g. one or more inner spring release prongs coupled to the inner spring, wherein the one or more inner spring release prongs are configured to move between an engaged position where the one or more inner spring release prongs maintain the inner spring in a compressed state and a disengaged position where the inner spring is released; and
   h. an electronic control system coupled to the one or more outer spring release prongs and the one or more inner spring release prongs.

2. The delivery system of claim 1 wherein the spring housing comprises a bottom surface at a first end and an open-ended second end, further wherein the outer spring comprises a first end coupled to the bottom surface of the spring housing.

3. The delivery system of claim 2 wherein the one or more container lips extend over a second end of the outer spring such that as the second end of the outer spring moves, the container and the inner spring positioned within the container move.

4. The delivery system of claim 2 wherein the one or more outer spring release prongs are coupled to a second end of the outer spring.

5. The delivery system of claim 1 wherein the electronic control system further comprises an electronically controlled release mechanism coupled to the one or more outer spring release prongs and the one or more inner spring release prongs.

6. The delivery system of claim 5 wherein the first end of the container is open-ended, and the container comprises a bottom surface at a second end, further wherein the inner spring comprises a first end coupled to the bottom surface of the container and a second end opposite the first end, wherein the container and the inner spring are configured such that the second end of the inner spring extends outside a perimeter of the outer spring when the inner spring is in a relaxed state.

7. The delivery system of claim 6 wherein the plate is coupled to a second end of the inner spring such that as the second end of the inner spring moves the plate moves.

8. The delivery system of claim 7 wherein the one or more inner spring release prongs are coupled to the second end of the inner spring.

9. The delivery system of claim 5 wherein the electronically controlled release mechanism comprises one or more first electromagnets, each first electromagnet positioned proximate one of the one or more outer spring release prongs.

10. The delivery system of claim 9 wherein the electronic control system further comprises an electronics control module configured to selectively send current to the one or more first electromagnets, thereby magnetizing the one or more first electromagnets.

11. The delivery system of claim 10 wherein the one or more outer spring release prongs comprise a material that is magnetically attracted to the one or more first electromagnets when the one or more first electromagnets are magnetized.

12. The delivery system of claim 11 wherein the one or more outer spring release prongs move toward the one or more first electromagnets when magnetized thereby moving the one or more outer spring release prongs to the disengaged position.

13. The delivery system of claim 10 wherein the electronically controlled release mechanism further comprises a second electromagnet, a center cord plate positioned proximate the second electromagnet, and a center cord coupled to the one or more inner spring release prongs and to the center cord plate.

14. The delivery system of claim 13 wherein the electronics control module is further configured to selectively send current to the second electromagnet, thereby magnetizing the second electromagnet.

15. The delivery system of claim 14 wherein the center cord plate comprises a material that is magnetically attracted to the second electromagnet when the second electromagnet is magnetized.

16. The delivery system of claim 15 wherein the center cord plate move toward the second electromagnet when magnetized thereby pulling the center cord and moving the one or more inner spring release prongs to the disengaged position.

17. The delivery system of claim 14 wherein the electronic control system further comprises a button coupled to the electronics control module, further wherein the button and the electronics control module are configured such that pushing the button activates the electronics control module to selectively send current to the one or more first electromagnets and the second electromagnet.

18. The delivery system of claim 5 wherein the electronic control system further comprises a battery.

19. The delivery system of claim 1 wherein the one or more container lips extend in a fixed position from the first end of the container, and the one or more container lips maintain a fixed position relative to the second end of the outer spring.

20. A fluid delivery system comprising:
   a. a spring housing;
   b. an outer spring positioned within the spring housing;
   c. a container positioned within the outer spring, wherein the container comprises one or more container lips extending from a first end of the container, further wherein the one or more container lips extend over a coil of the outer spring;
   d. an inner spring positioned within the container;
   e. a plate coupled to the inner spring;
   f. one or more outer spring release prongs coupled to the outer spring, wherein the one or more outer spring release prongs are configured to move between an engaged position where a portion of the one or more outer spring release prongs physically prevents the outer spring from moving and maintains the outer spring in a compressed state and a disengaged position where the portion of the one or more outer spring release prongs no longer physically prevents the outer spring from moving and the outer spring is released;
g. one or more inner spring release prongs coupled to the inner spring, wherein the one or more inner spring release prongs are configured to move between an engaged position where the one or more inner spring release prongs maintain the inner spring in a compressed state and a disengaged position where the inner spring is released;
h. an electronic control system coupled to the one or more outer spring release prongs and the one or more inner spring release prongs; and
i. a vial filled with a fluid, wherein the vial comprises a fluid output opening and a plunger, wherein the plunger is coupled to the plate.

\* \* \* \* \*